Figure 1:
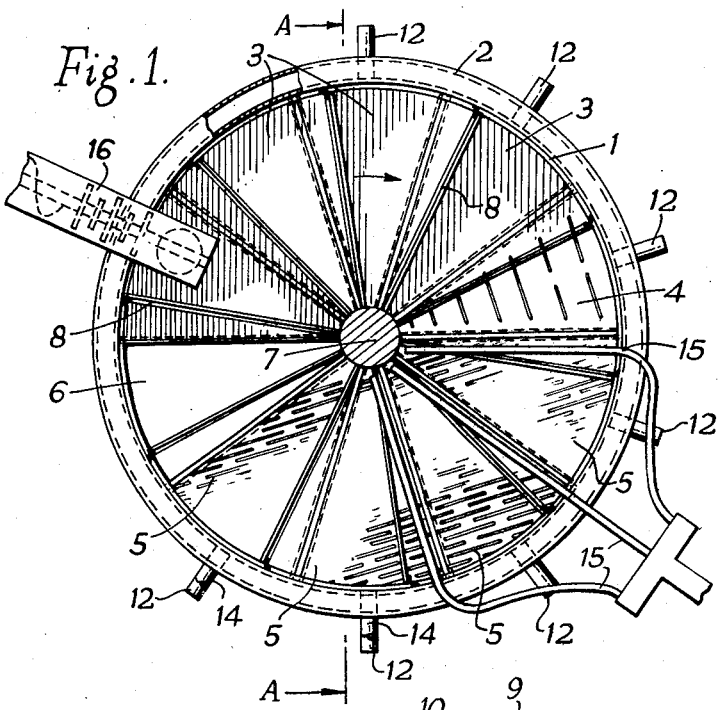

Nov. 22, 1960    A. H. COOK ET AL    2,961,316

PROCESS AND APPARATUS FOR THE PREPARATION OF WORTS

Filed May 27, 1959

INVENTORS
ARTHUR H. COOK
ARTHUR D. DAVIS
BY
Wenderoth, Lind & Ponack
ATTORNEYS

United States Patent Office 2,961,316
Patented Nov. 22, 1960

2,961,316

PROCESS AND APPARATUS FOR THE PREPARATION OF WORTS

Arthur Herbert Cook, and Arthur Desmond Davis, Nutfield, Redhill, England, assignors to Brewing Patents Limited, London, England Filed May 27, 1959, Ser. No. 816,321

Claims priority, application Great Britain May 30, 1958

11 Claims. (Cl. 99—52)

This invention relates to an apparatus and a process for the preparation of worts, that is to say, to the process of mashing malted grain with hot water.

It has already been proposed to prepare worts by continuously feeding mixtures of hot water and malted grain, either alone or together with various starchy adjuncts, into either the bottom or the top of a tube or tower equipped with means for maintaining the temperature of the contents at a desired level and separating the "goods," alternatively known as the spent grains, from the wort at the top or bottom respectively. The rate of flow of the fresh malted grains and water and the rate of take-off of the spent grains and wort is so adjusted that the chemical changes involved in the mashing process are controlled to a desired extent by the time taken for the grains to pass through the length of the tube or tower.

A conventional mash tun is operated in a batch-wise manner and the wort is usually drawn off from the base of the vessel through the bulk of the spent grains which form an effective filter so as usually to ensure the production of a clear wort, except for the first runnings which are added back to the bulk of the liquid in the tun. Although it produces a wort of satisfactory quality, the disadvantage of the conventional mash tun is that it is very slow to use, because the filtration rate through the customary bed of mash of 3–6 foot depth is very slow. Most brewers find that it is necessary, after the wort has been run off, to sparge or wash the bed of grain in the bottom of the tun for several hours, to ensure satisfactory extraction of the malted grain. It is also necessary to clean out the tun between successive batches of mash, so that it is frequently the case that only one batch of mash is fed into the tun in a day.

When, on the other hand, the preparation of worts is effected continuously in a manner substantially as described above, the production of a clear extract is more difficult or even impossible, perhaps because the grains are kept in a state of movement and are therefore subject to some degree of abrasion, with the result that the wort contains fine particles. This cloudiness, which often renders the wort obtained directly by the above-mentioned continuous process undesirable to many brewers, constitutes a serious disadvantage, because additional equipment has to be employed to clarify the liquid before it can be satisfactorily used for brewing beer.

It is an object of the present invention to provide a continuous flow method of preparing worts in which a wort of greater clarity is produced than has been the case with the continuous method of preparing worts referred to above. It is a further object of the invention to provide apparatus of mechanical simplicity for the continuous production of worts of satisfactory clarity.

It is a further object of the invention to provide an apparatus for the continuous preparation of worts which can be so adjusted that the rate of the output of wort therefrom can be regulated without at the same time affecting the quality and characteristics of the resultant wort.

According to one aspect of the invention, apparatus for the preparation of worts comprises a vertical vessel of circular cross section, an axially mounted rotatable spindle carrying a plurality of vanes adapted to co-operate with the side wall and bottom of the vessel so as to divide it into a plurality of separated mash-receiving compartments, means for feeding mash into the top of the vessel at a position over an imperforated section of the bottom, the bottom of the vessel having arranged around it in successive angular positions an imperforated section, a perforated filtering section and a discharge section and the spindle rotating in such sense as to carry the mash successively over the imperforated section of the floor, the perforated section and finally over the discharge section, at least one wort collecting trough with one or more outlets being provided under the perforated section of the floor.

According to another aspect of the invention, a process for the preparation of worts comprises feeding mash into a circular vertical vessel divided into a plurality of separate sector-shaped compartments by members carried by a rotating vertical spindle, successively holding the mash over an imperforated section of the vessel bottom for a sufficient time to permit the settlement of the spent grains to form a filtering bed, carrying the mash over a perforated section of the vessel bottom for a sufficient time to permit adequate separation of the wort from the grains collecting the separated wort and carrying the spent grains over a discharge section of the vessel bottom to remove the same from the vessel.

The process is preferably operated in such manner that the depth of the bed of mash is 6–15 inches, so that the filtration rate through it is much greater than in a conventional mash tun, with consequent speeding up of the full mashing cycle. The bed of mash will settle to a depth rather more than half its initial depth.

The outside wall of the vessel is preferably jacketed to permit the temperature of the contents to be controlled in such manner as is desired, particularly for the conversion period between the addition of the mash to the vessel and the commencement of the filtration of extract. The jacketing of the wall permits the temperature of the mash to be maintained at a constant temperature, as is usual in English brewing, or if steam is blown through the jacket, the temperature of the mash may be slowly raised in its passage from the entry point to the commencement of separation of the extract from the spent grain, as is customary in decoction mashing.

It is preferred to provide a series of angularly spaced sparge arms over the perforated section of the floor of the vessel and these sparge arms may be used to feed a trickle of liquor over the grains to effect a washing action. The sparge arms may be supplied with hot water or with weak wort for this purpose, or there may be two sets of sparge arms, one for water and one for weak worts. The collecting trough under the slotted section of the bottom of the vessel is preferably divided into a number of separate compartments, and it will be appreciated that the wort which collects in these separate compartments, after the point at which washing commences, will be of decreasing strength. In order to strengthen these weak worts, they may be used for washing and extraction of the spent grains at an earlier stage. In effect, the weak worts will be fed round counter-current to the movement of the spent grain. Since, however, the filtration rate for weak worts will be greater than for the more viscous strong worts, it is not possible to pump back all the weak worts to an earlier stage if all the compartments of the collecting trough are of the same size. It is convenient, however, to separate off a proportion of the weak worts from each compartment and to pump the remainder back. This can be easily arranged by providing two outlets from each compartment, from one of which liquid is pumped back at a constant rate to an earlier stage, whilst the remainder of the liquid collecting in the compartment overflows through the other outlet and is separated off.

The weak worts may be reheated or even boiled before they are fed back into the vessel; in the latter case the so-called "hot break" is achieved, in which a proportion of the protein material is broken down to form an insoluble material, which is, of course, retained in the filter bed of grains, when the wort is fed back into the vessel.

The floor of the apparatus is preferably formed of a series of sector-shaped plates, which are readily interchangeable. By substituting slotted plates for plain plates or vice versa the imperforated section of the bottom can be shortened or lengthened. This permits the rate of rotation of the vane to be decreased or increased without changing the dwell time of the liquor in contact with the malted grain and, in consequence, permits the effective operating rate of the apparatus to be controlled.

The first plate in the perforated section of the floor of the vessel is preferably provided with a relatively small number of slots, through which the cloudy first runnings issue. This liquor is that which is actually contained in the grains as it is settling to form a filter layer and is usually found to be cloudy in the conventional mash tun process. In the present process the cloudy first runnings are fed back into the vessel for refiltration.

Figure 2:
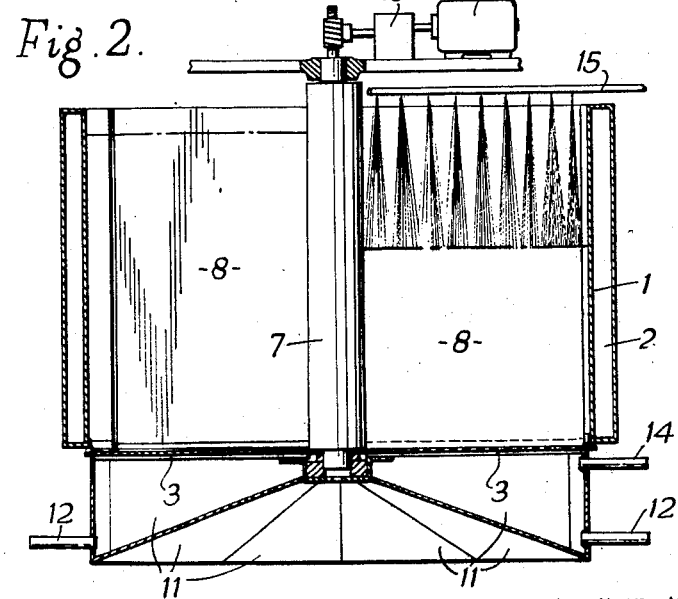

Reference is hereinafter made to the accompanying drawings, wherein:

Figure 1 is a plan view of an apparatus made in accordance with the invention, and Figure 2 is a section on line A—A of Figure 1.

The apparatus comprises a cylindrical container having a body 1 provided with a jacket 2 for the passage of hot water or steam. The jacket 2 can be divided up into separate mutually isolated sections, if it is desired to apply heat to the contents of the body 1 in different ways at different points in its passage through the apparatus.

The floor of the cylindrical body is composed of plain plates 3, a plate 4 having a few slots for separation of "first runnings" and slotted plates 5. The floor is also provided with a discharge opening 6. The floor plates are sector shaped and are each interchangeable with one another so that any plate can be inserted at any position. For this purpose the body is provided with radially arranged inverted T-irons to support the floor plates. The side wall of the body 1 is provided with a peripheral sealing flap which seals against the top surface of the plates and permits them to be slid in and out for the purpose already explained.

A rotor 7 has a plurality of radial arms 8 which are provided with rubber wiper seals to seal against the floor and side walls of the apparatus, so that it effectively divides up the interior of the body 1 into a number of separate compartments. The rotor 7 is driven by a motor 9 through a variable reduction gearing 10, so that the rotation rate of the rotor 7 can be controlled as desired.

A series of separate collecting tanks or "underbacks" 11 are provided under the floor, and each of these is provided with a separate outlet connection 12 and preferably also with an upper outlet connection 14 for at least the later tanks in the series.

A series of sparge arms 15 is provided over the slotted section of the floor for supplying a trickle of hot water over the grains that are carried underneath the arms. A second series of such arms (not shown) may be provided if it is desired to feed back the weak worts which collect in the later tanks of the series.

Mash is fed into the container from a masher 16, the construction of which forms no part of the present invention. The masher is arranged to deliver a predetermined quantity of mash to each successive compartment, defined by a pair of radial arms 8 of the rotor 7. The operation of the masher for each successive delivery is initiated by the rotor and there are a great many different arrangements which can be used for this purpose.

The mash fed into the container is carried round slowly by the rotor over the floor until the spent grains reach the discharge opening 6. The speed of rotation of the rotor is set so that the mash is traversed over the unslotted portion of the floor in the time desired for extraction and conversion, whilst its temperature is controlled (i.e. held substantially constant or raised or lowered) during the same period, depending on the temperature of the water or steam passed into the jacket 2. The wort begins to separate from the mash as soon as the slotted floor plate 4 is reached and the grains begin to settle on the floor to form a filter bed for the wort which separates off through the slotted floor plates 5.

The further treatment of the wort depends on the manner in which the outlets from the collecting tanks 11 are connected.

The relatively small amount of first runnings separating through the plate 4 is preferably pumped straight back into the container for refiltration.

Relatively strong wort is collected in the tank under the first slotted plate 5 and this wort is pumped away to a holder (not shown). The wort collecting in the later tanks will be relatively weaker as it consists of the liquor washed out of the grains as a result of sparging the grains with hot water from the sparge arms 15. Since this liquor will be less viscous at each successive slotted plate 5, the rate of filtration will rise, so that the rate of collection of wort rises at each successive slotted plate.

If it is desired that the wort shall be strong, weak wort collected in the later tanks 11 is pumped back at a constant rate through a sparge arm positioned over a preceding tank. Such returned wort will be drawn off through the lower outlet connections 12 of the tank, and any surplus weak worts collecting in the tanks will overflow through the upper connections 14 and be led away to a holder. As has already been mentioned, wort which is to be returned to the container can be boiled or reheated before it is sparged over the bed of grains.

It will be observed in the drawings that tanks are shown under some of the plain plates of the floor. These tanks are provided in case it is desired to operate the apparatus at a reduced output, using a slower rotor speed and a consequent shorter length of imperforated floor, so as not to change the conversion time of the mash.

To exemplify the process mash was delivered to the container in successive portions, each comprising 75 lbs. malt and 20 gallons water at a temperature of 155° F. so as to give a temperature of about 145° F. in the container. The size of the vessel was such that this quantity filled the compartment to a depth of about 12 inches. The rotor 7 was set to turn at such a speed that the mash was subjected to a conversion period of ½ hour, before filtration of the worts commenced. During the conversion period the mash was held at a temperature of 145° F. by passing hot water through the jacket 2.

Wort of a strength of 1.080 specific gravity was collected in the tank under the first slotted plate 5.

The spent grain was sparged with water at a temperature of 165° F. and weak worts of strengths of 1.050, 1.015 and 1.002 specific gravity were collected at the succeeding tanks.

To decrease the rate of production of wort, it is necessary only to slow down the rotor and decrease the effective length of the imperforated floor accordingly.

We claim:

1. Apparatus for the preparation of worts comprising a vertical vessel of circular cross section having a side wall and a floor, an axially mounted rotor carrying a plurality of vanes adapted to substantially seal against the side wall and floor of the vessel so as to divide it into a plurality of separated mash-receiving compartments, the floor of the vessel having in successive angular positions an imperforated section, a perforated filtering section, and a discharge section, means for feeding mash into the top of the vessel at a position over an imperforated section of the floor, means for rotating the rotor in such direction as to carry the mash successively over the imperforated section and the perforated section to the discharge section, at least one wort collecting tank being provided under the perforated section of the floor.

2. Apparatus according to claim 1, further including at least one sparge arm located over the perforated section of the floor.

3. Apparatus according to claim 1, wherein at least a portion of the floor of the vessel is built up of removable and interchangeable sector-shaped plates to permit the substitution of slotted plates for plain plates and vice versa.

4. Apparatus according to claim 1, further comprising variable speed drive means for turning the rotor.

5. A process for the preparation of worts comprising feeding mash in separate quantities, moving said separate quantities of mash in a horizontal arcuate path, holding said mash in an unfiltered condition while moving it in a first part of said path and during such period as is necessary for converting the mash and for settlement of spent grains to form a filter bed, filtering the wort from and through the spent grains while moving it in a second part of said path, and collecting the separated wort and discharging spent grains at a third part of said path.

6. A process according to claim 5, wherein the temperature of the mash is maintained substantially constant during the conversion period.

7. A process according to claim 5 wherein the grains of the mash are sparged with water at successive positions as they are carried through the second part of the path.

8. A process according to claim 7 wherein the progressively weaker worts resulting from the sparging operation are collected separately at different positions along said second part of said path.

9. A process according to claim 8, wherein weak wort is sparged over the grain at a point upstream of that at which the wort is separated from the grain.

10. A process according to claim 9, wherein weak wort is reheated before return to the vessel.

11. A process according to claim 9, wherein weak wort is boiled before return to the vessel.

References Cited in the file of this patent
UNITED STATES PATENTS 2,003,892     Keller _____ June 4, 1935